United States Patent [19]

Lillie et al.

[11] Patent Number: 4,675,882
[45] Date of Patent: Jun. 23, 1987

[54] FM DEMODULATOR

[75] Inventors: Ross J. Lillie, Schaumburg; Steven C. Jasper, Hoffman Estates, both of Ill.

[73] Assignee: Motorola, Inc., Schaumburg, Ill.

[21] Appl. No.: 751,913

[22] Filed: Sep. 10, 1985

[51] Int. Cl.$^4$ .............................. H04L 27/16
[52] U.S. Cl. ................................ 375/80; 329/50; 329/112
[58] Field of Search .............. 375/44, 45, 78, 80, 375/82, 94, 97, 39; 329/50, 103, 110, 122, 124; 455/214, 337

[56] References Cited

U.S. PATENT DOCUMENTS

| | | | |
|---|---|---|---|
| 3,949,301 | 4/1976 | Matter | 455/214 |
| 4,311,964 | 1/1982 | Boykin | 329/110 |
| 4,317,210 | 2/1982 | Dekker et al. | 375/80 |
| 4,379,284 | 4/1983 | Boykin | 329/110 |
| 4,506,228 | 3/1985 | Kammeyer | 375/82 |
| 4,514,697 | 4/1985 | York | 375/82 |
| 4,539,524 | 9/1985 | Goode | 375/94 |
| 4,560,941 | 12/1985 | Welles, II et al. | 455/214 |
| 4,563,650 | 1/1986 | York et al. | 329/110 |
| 4,577,157 | 3/1986 | Reed | 329/103 |

OTHER PUBLICATIONS

"Communications Receivers of the Future", Frank P. Chiffy and Bjorn E. Bjerede, Signal, Nov./Dec. 1985, pp. 16–21.

Primary Examiner—Robert L. Griffin
Assistant Examiner—Stephen Chin
Attorney, Agent, or Firm—Joseph T. Downey; James E. Jacobson

[57] ABSTRACT

A digital FM demodulator is described. According to the principles of the present invention, a digital FM signal is demodulated by processing sampled input vectors of a quadrature FM digital signal centered approximately zero frequency. The sampled quadrature input vectors are quantized to lie within a predetermined magnitude range. The quantized vectors are coupled to a phase accumulator which generates a current coarse phase value related to input vectors of the quadrature FM signal. The output of the phase accumulator is also coupled to a vector rotation means which rotates the input vector to a predetermined quadrant to determine a fine phase value based on said rotated input signal vector. The fine and coarse values are then summed and output as a composite phase value, and digitally filtered by subtracting the value of the previous composite phase angle sample from the value of the current composite phase angle sample to produce a demodulated message sample.

4 Claims, 13 Drawing Figures

FM DEMODULATOR

FIELD OF THE INVENTION

This invention relates generally to the field of digital ratio communications and specifically to an implementation of an FM demodulator which is compatible with digital signal processing techniques.

BACKGROUND OF THE INVENTION

FM demodulation is routinely performed using analog signal processing techniques. Recently, techniques have developed which allow an analog communications signal to be processed using digital signal processing techniques. These techniques include methods which may involve phase sampling and discriminating an incoming signal to recover message information. Typically, quadrature detection is employed to recover the message information. A major problem exists with these types of digital signal processing techniques. They provide a receiver structure which inherently exhibits a narrow dynamic range. Since the processed signal exhibits a narrow operational signal dynamic range, additionally required processing adds the complexity of phase sampling, and AGC stages to the digital receiver structure.

Throughout the literature pertaining to the implementation of digital FM demodulators, the most common techniques cited involve either monitoring signal zero crossings, or a more conventional type of signal discrimination such as quadrature detection. Both of these approaches involve calculation of signal power, which limits the usable signal dynamic range which is processed by the FM demodulator.

These approaches have several disadvantages, some of which are the complexity and signal processing overhead required to implement the necessary gain control of the incoming signal, and the resulting narrow dynamic range of the FM detector. The characteristics of prior digital FM demodulators also produce an output signal having distortions introduced by the non-linearities of the demodulation technique.

SUMMARY AND OBJECTS OF THE INVENTION

For the foregoing problems, the present invention contemplates an improved digital FM demodulator which processes sampled input vectors comprising a quadrature FM signal centered substantially at zero frequency. According to the teachings of the present invention, the sampled quadrature input vectors are scaled to lie within a predetermined magnitude range. The scaled vectors are coupled to a phase accumulator means for generating a current coarse phase value related to input vectors of the quadrature FM signal. The output of the phase accumulator is also coupled to a vector rotation means which rotates the input vector to a predetermined quadrant to determine a fine phase value based on said rotated input signal vector. The fine and coarse phase values are then summed and output as a composite phase value, and digitally filtered by subtracting the value of the previous composite phase angle sample from the value of the current composite phase angle sample to produce a demodulated message sample.

The present invention, thus eliminates any AM to FM conversion in the demodulator output signal, within the limits of the accuracy of the mathematical approximations used to recover the message signal. The present invention performs equally well with narrow or wide band signals, experiencing none of the nonlinearities that appear with other detection schemes.

Since the present invention does not require the use of a signal power calculation at any place in the implementation, it provides a much greater useable input signal dynamic range over that of prior digital FM demodulators. Finally, due to the overall efficiency of the algorithm proposed, there is less processing overhead allowing the invention to be implemented in a single general purpose digital signal processing chip.

Accordingly, it is an object of the present invention to provide a digital FM demodulator wherein the input frequency-to-output signal linearity is substantially ideal.

It is another object of the present invention to provide a digital FM demodulator which provides a direct solution for the mathematical approximations employed in the digital demodulation process.

It is still another object of the present invention to provide a digital FM demodulator which substantially eliminates AM to FM conversion in the demodulator output signal.

It is yet another object of the present invention to provide a digital FM demodulator which provides near ideal limiting of the input signal

BRIEF DESCRIPTION OF THE DRAWINGS

FIGS. 6a through 6b are flow diagrams of the operation of the scale routine described in conjunction with FIG. 5a.

DETAILED DESCRIPTION OF THE INVENTION

Figure 1:
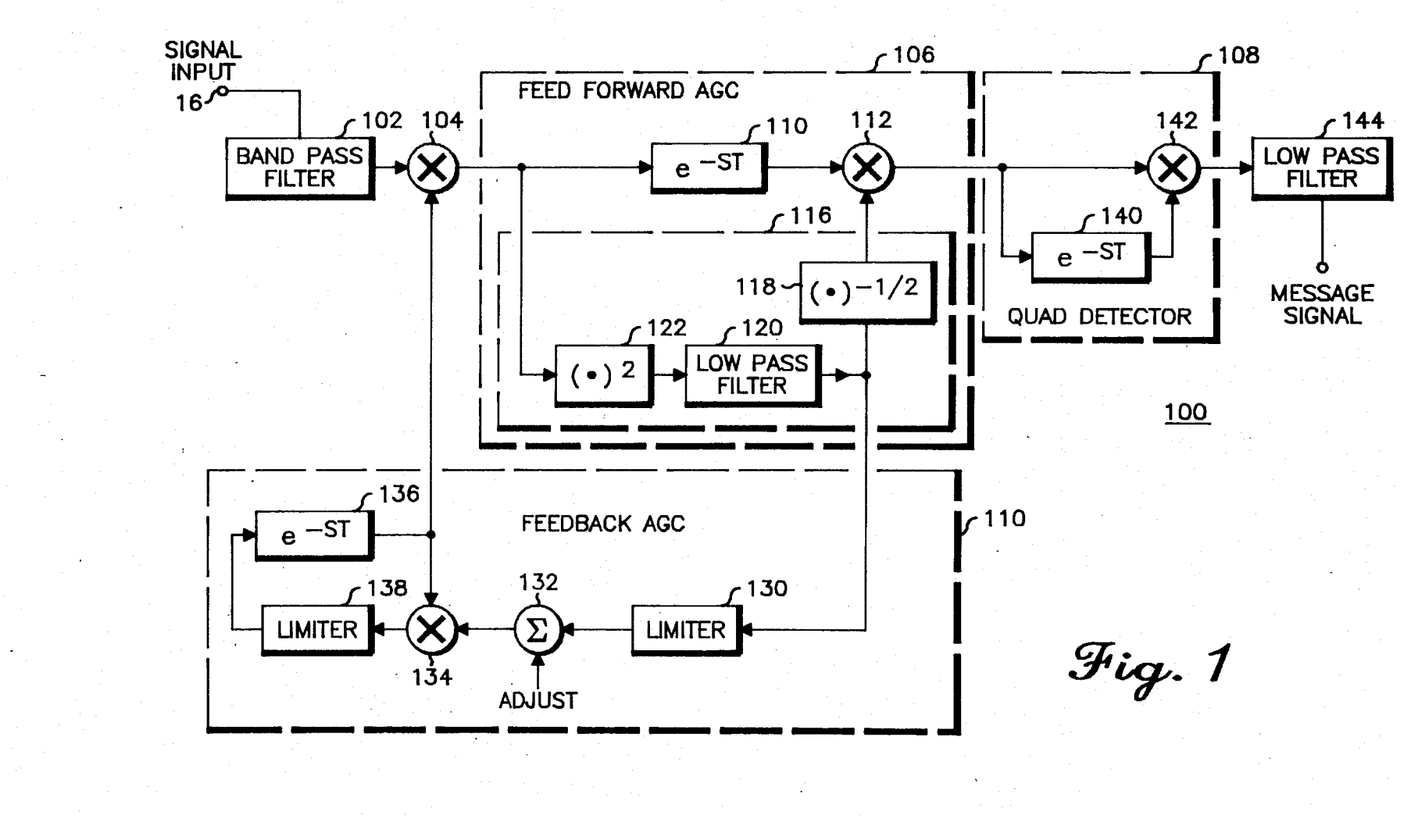
FIG. 1 is a block diagram of a digital FM demodulator.

FIG. 1 is a block diagram of one type of a digital FM demodulator. According to FIG. 1, a received digitized signal, passed through a bandpass filter 102 to remove out-of band noise, is coupled to the feed-forward automatic gain control (AGC) 106 which performs the signal limiting necessary to reduce any AM to FM conversion at the output of the demodulator. Automatic gain control is accomplished by coupling the output of the digital mixer 104 to a squaring circuit 122. The output of squaring circuit 122 is coupled to a filter 120, which is coupled to an inverse squaring device 118. The feed forward signal produced at the output of 116 represents the inverse of the root-mean-square signal level, which is multiplied with the output of the digital delay filter 110, by the digital multiplier 112. A feedback network 110 is also coupled to the output of the digital low pass filter 120 which produces an AGC feedback signal which is combined with the input signal by digital multiplier 104. The input to the feedback AGC is formed by a limiter 130 having an output coupled to the digital summer 132. Another input to the digital summer 132 is coupled to an adjust constant which when summed 132 with the output of limiter 130 produces a composite signal within a desired magnitude range. The adjusted output of summer 132 is coupled to a digital mixer 134 which generates the feedback signal by mixing the output of summer 132 with the delayed limited output of the digital mixer 134. The delay generated by the digital delay 136 produces the feedback signal output signal in conjunction with digital multiplier 134. The limiter stages 130 and 138 constrain the signal level of the input to the feedforward AGC 106 to lie within the narrower dynamic range imposed by the root mean square signal level calculation 116.

One drawback of this approach is the need for the feedback AGC 110 which further limits the dynamic range of the input signal due to processing constraints imposed by the feed forward AGC signal power calculation. The feed forward signal produced at the output of 116, requires a signal dynamic range twice that of the input signal because of the operation of the squaring circuit 122. This necessitates a limiting of the input signal dynamic range as performed by the feed back network 110. Another drawback with the above approach is that AGC circuits 106 and 110 do not respond instantaneously to changes in input level, since they exhibit filter-like characteristics with some time constant. Therefore, they do not fully remove AM from rapidly fading signals The quad-detector 108 performs the actual message signal recovery, however at the expense of requiring fairly narrow-band FM signals to limit the effects of nonlinearities of this type of detection. The quad-detector 108 is formed by a digital mixer 142 which mixes the output of the feed forward AGC 106 with the output of the digital delay 140. The digital delay 140 produces an output signal which comprises a delayed version of the output of the feed forward AGC 108. The message signal is then processed by a low pass filter 144 which removes the effects of quantization inherent in digital signal processing. The low pass filter 144 is a digital filter which removes extraneous (sum-frequency) terms output by quad detector 108 and which remove FM noise outside the message bandwidth.

Figure 2:
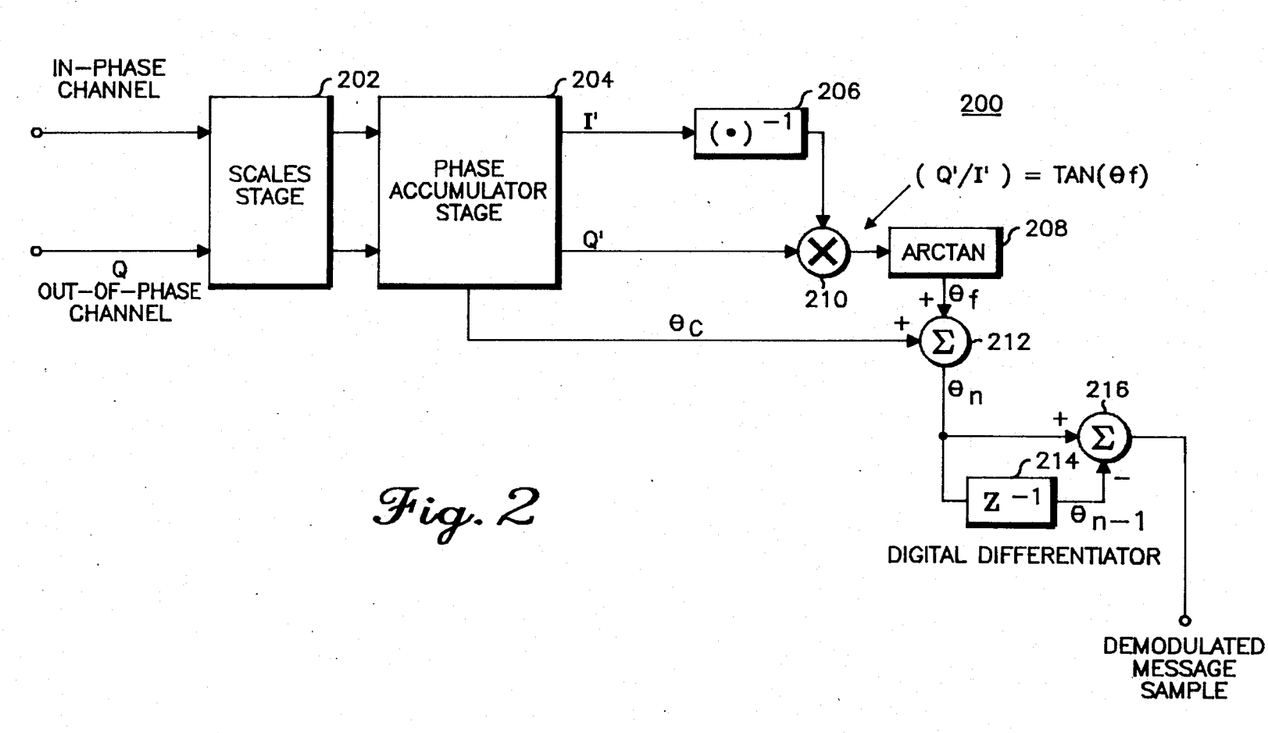
FIG. 2 is a schematic diagram of the improved digital FM demodulator of the present invention.

FIG. 2 is a schematic and block diagram of the improved digital FM demodulator of the present invention. The inputs to the digital FM demodulator consist of vector sample pairs comprising in-phase (I) and out-of-phase, or quadrature (Q) samples. The (I) and (Q) samples represent the real and imaginary parts, respectively, of the complex phasor representation of the received FM signal, which has been frequency-translated to approximate zero Hz. The scaling stage 202 serves to scale the amplitude of the signal vector to a range suitable for use by the approximations used to generate the inverse of the in-phase signal component produced by the reciprocator 206, the inverse-tangent or arctangent generator 208, and the product of the out-of-phase signal component and the inverse of the in-phase signal component produced by digital multiplier 210. The scaling register stage 202 also performs the necessary conditioning to allow the phase accumulation stage 204 to determine the resultant phase angle of the input signal vector to within $\pi/4$ radians of its actual value. After the determination of the 'coarse' phase value of the input signal vector, the phase accumulation stage 204 stores this phase value at a temporary register location, and performs a vector rotation of the signal vector by an amount equal to the negative of the coarse phase value. The tangent product word generated by the digital multiplier 210, represents the tangent of this rotated signal vector. The arctangent generator 208 computes the phase angle of this rotated signal vector yielding a value equal to the 'fine' phase value of the input signal vector. The 'coarse' phase value and the 'fine' phase value are summed together with a digital summer 212 to yield the composite phase angle for the input signal vector. This phase value is finally summed by the digital summer 216 with the negative of the delayed phase value of the previous input signal vector sample produced by the digital phase delay 214. The digital 'differencing' produced by digital summer 216 represents a digital differentiator, the output of which is the demodulated message signal.

Figures 3, 4A, 4B, 4C:
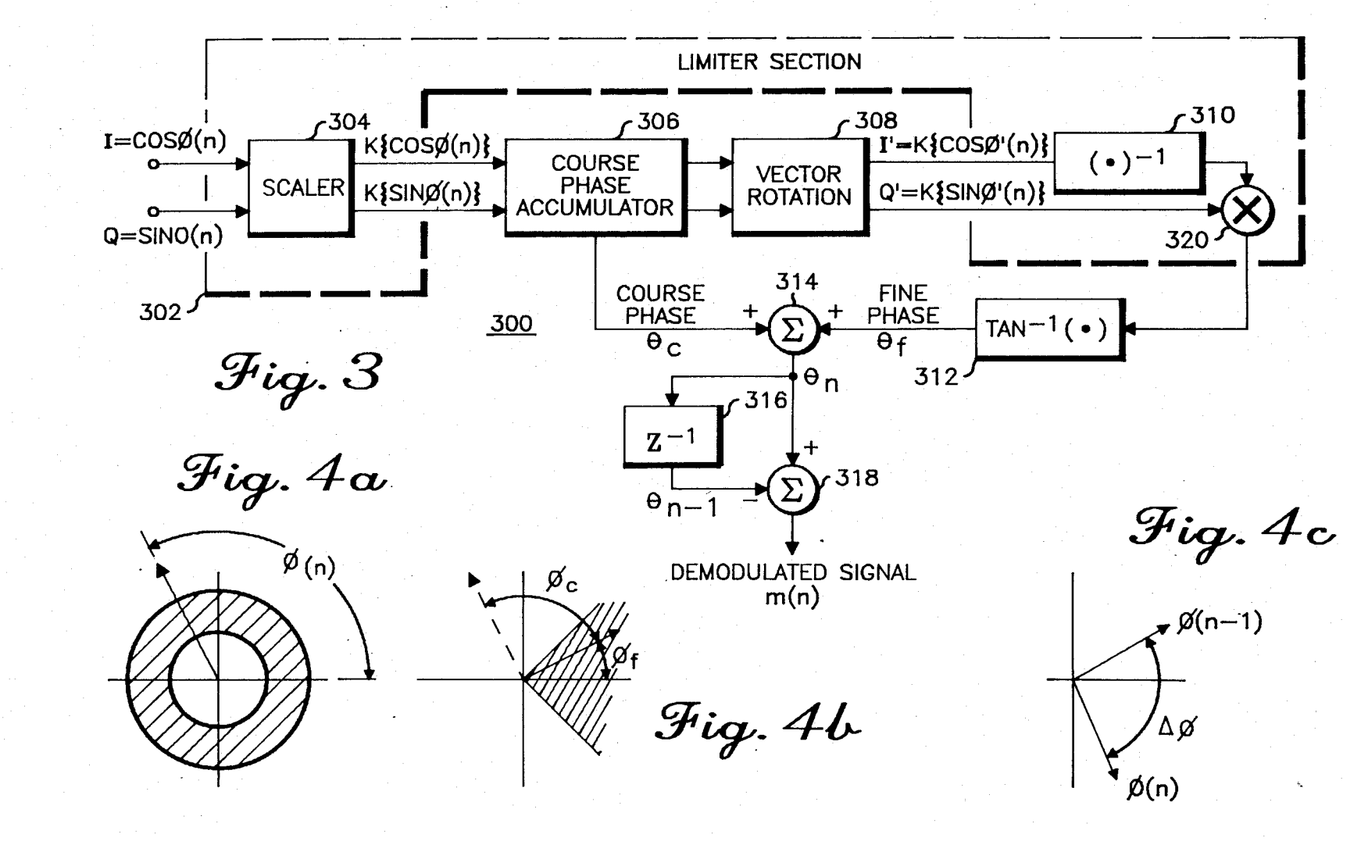
FIG. 3 is a more detailed diagram of the improved digital FM demodulator of the present invention.
FIGS. 4a through 4c are diagrams detailing the principles of phasors in the context of the present invention.

FIG. 3 is a more detailed diagram of the improved digital FM demodulator of the present invention. According to FIG. 3, limiter section 302 comprises the scaling stage 304 together with the in-phase channel inverse calculation generator 310 and the product multiplier 320 where the reciprocal of the scaled and rotated in-phase (I') component is multiplied with the scaled and rotated out-of-phase (Q') component producing a term equal to the value of the tangent of the phase angle of the scaled and rotated signal vector sample. The action of digital multiplier 320 operating in conjunction with reciprocator 310 performs an ideal limiting of any amplitude variations of the input signal vector that may be present. The term passed from the digital multiplier 320 represents the tangent of the rotated and scaled signal vector sample. This term is processed by the arctangent generator stage 312 whose output equals the phase angle of the rotated and scaled signal vector. This quantity when added by digital summer 314 to the coarse phase value output from the coarse phase accumulator 306 represents the total phase angle of the input signal vector sample. The difference signal generated at the output of digital summer 310 between the phase angle of the current signal vector sample and negative of the delayed output generated by digital delay 316 represents 1 sample of the output demodulated message.

FIGS. 4a through 4c are diagrams detailing the principles of phasors in the context of the present invention. Referring now to FIG. 4a, the scaler's 304 function is to scale the amplitude of the input signal vector of varying magnitude to the shaded region shown. The coarse phase accumulator 306 determines the coarse phase angle of the signal vector, $\phi_c$, and the output of the arctangent generator stage 312 equals the fine phase of the signal vector, $\phi_f$, as depicted in FIG. 4b. The signal vector $\phi_f$ is constrained by the vector rotation to lie in the range of $-\pi/4 \leq \phi_f \leq +\pi/4$ (shaded region of FIG. 4b). The sum of these 2 quantities generated at the output of digital summer 314 represents the total phase angle of the input signal vector sample, $\phi(n)$. The difference value ($\Delta\phi(n)$) generated by digital summer 318 between the current phase sample, $\phi(n)$, and the previous phase sample, $\phi(n-1)$ generated by digital delay 316, as shown in FIG. 4c, represents one sample of the demodulated output message. The stream of samples representing the demodulated output message may be low passed filtered to remove noise outside the message bandwidth, as is typically performed subsequent to FM detection.

It would be obvious to one of ordinary skill in the art that the digital demodulator described in the figures above could be implemented with discrete hardware digital multipliers, adders, registers, etc. The digital demodulator of the present invention is particularly suitable for implementation with a class of devices known as digital signal processors. The present invention would perform satisfactorily with a variety of well known digital signal processors such as NEC μPD7720 available from Nippon Electronics U.S.A. Inc., One Natick Executive Park, Natcik, Mass. 01760 or a TMS 32010 available from Texas Instruments Inc., P.O. Box 225012, Dallas, Tex., 75265. Digital signal processors generally include hardware high speed digital multipliers as well as the ability to process a digital data stream in accordance with a predetermined algorithm.

Figure 5A:
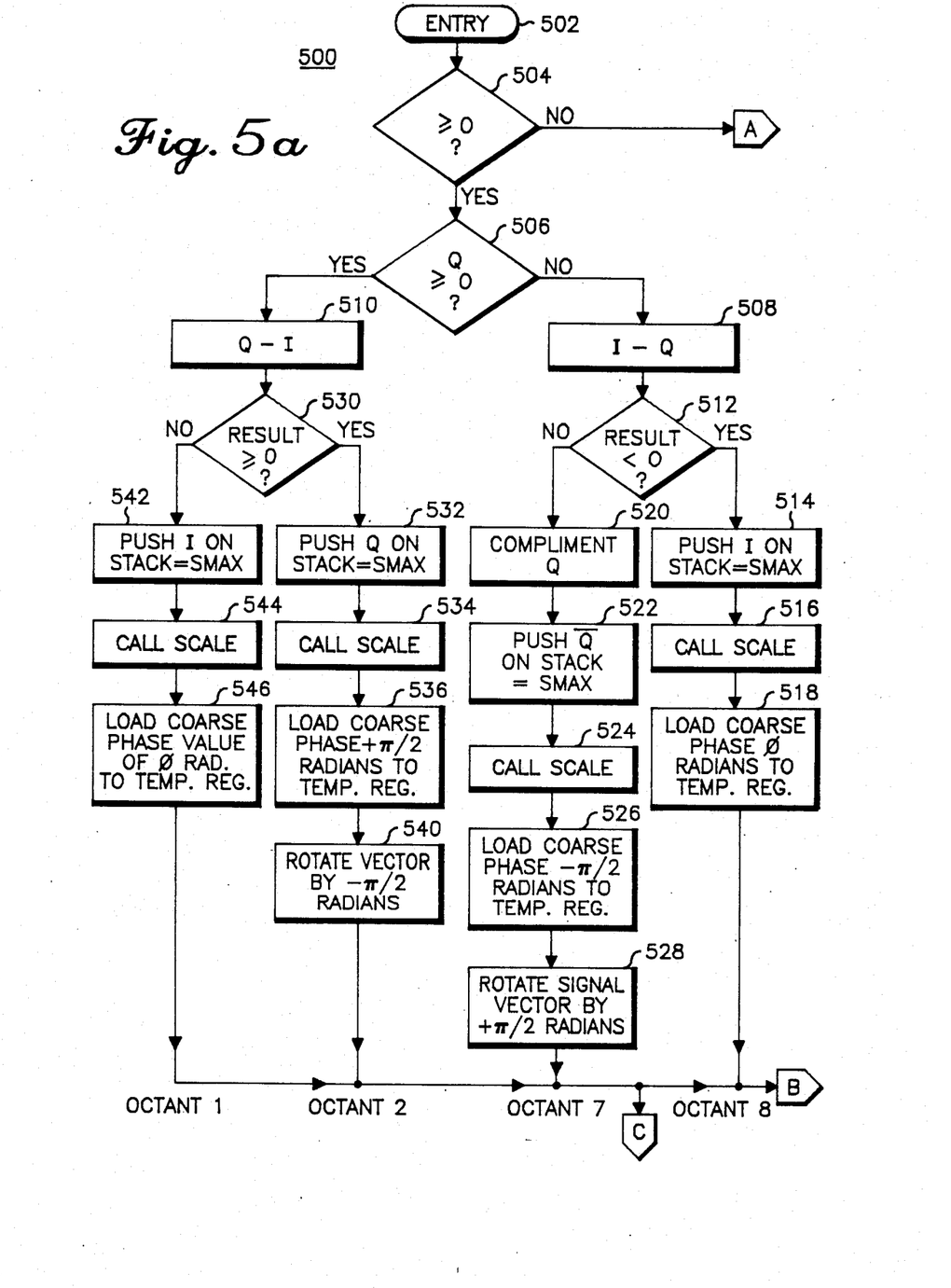
FIGS. 5a and 5b are flow diagrams detailing the operation of the background routine of the present invention.
Figure 5B:
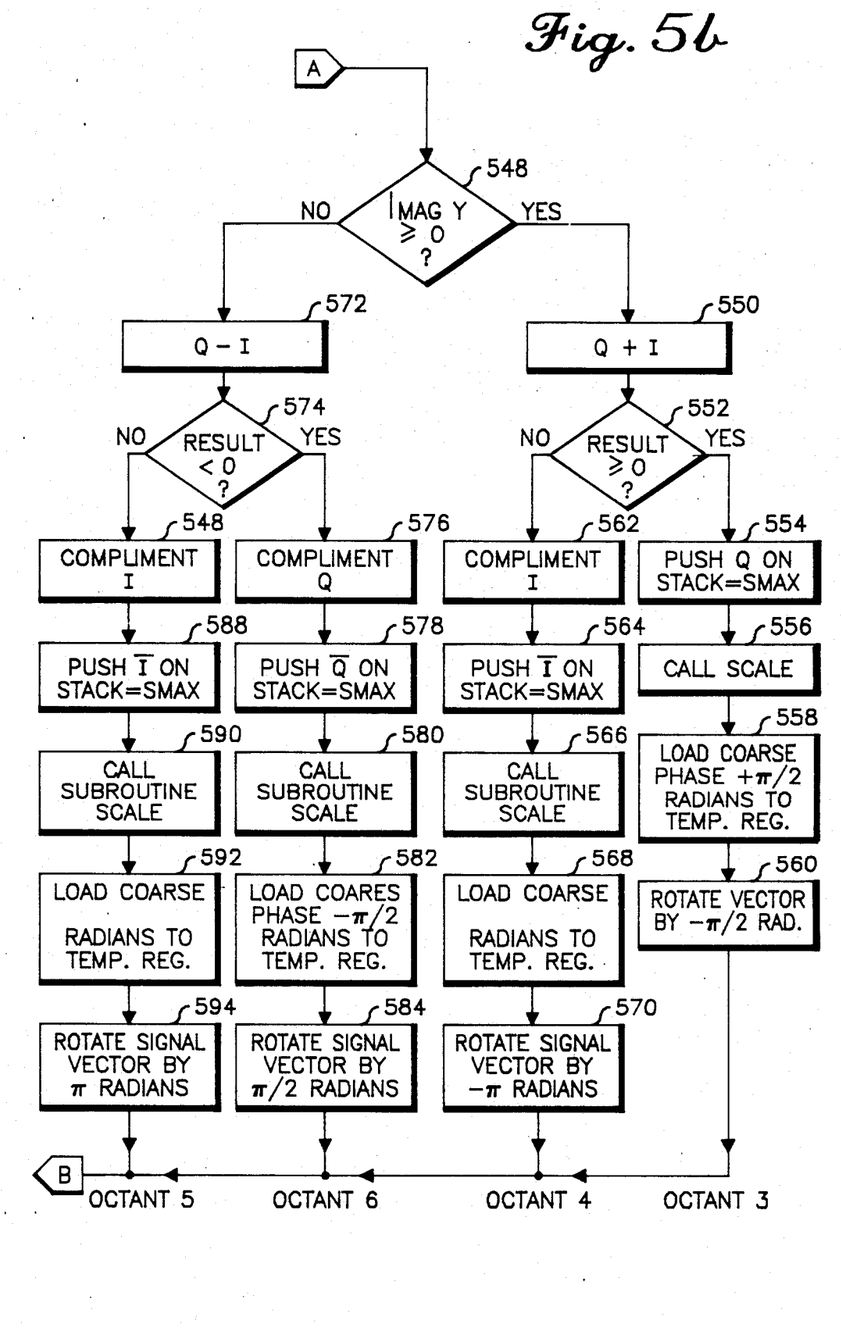

FIGS. 5a and 5b are flow diagrams detailing the background processing of the present invention as implemented with a digital signal processor. In all descriptions of the present invention, the in-phase and out-of-phase signal vector components will hereinafter be referred to as the components I and Q respectively. The algorithm of the present invention begins at 502, which causes the digital signal processor to execute decision 504 to determine the sign of the I component. Based on the outcome of decision 504, the sign of the Q component is determined by decisions 506 and 548. Next, the difference of the I and Q components is determined by items 510, 508, 572, and 550 which generate values comprising the values of Q−I, I−Q, Q−I, and Q+I respectively. The sign of the respective results is determined by decisions 530, 512, 574, and 552, respectively. Based on the results of these decisions, the component (I or Q) which has the greater absolute value is known, and the octant (i.e. multiple of $\pi/4$) in which the signal vector lies is also known. This value, if less than zero, is complemented by items 520, 586, 576, and 562, respectively. The value the represents the greatest absolute value of either the I or Q channel is pushed onto a program stack by items 542, 532, 522, 514, 588, 578, 564, or 554, respectively, and is hereafter referred to as the quantity SMAX. The quantity SMAX is used by the call to the scale subroutine items 544, 534, 522, 516, 590, 580, 566, or 556, respectively, to determine the correct amount of scaling to be applied to the input signal vector sample. The scale subroutine returns correctly scaled signal vector components I and Q. Next a coarse phase value, based on the octant location of the signal vector is stored to a temporary storage location by items 546, 536, 526, 518, 592, 582, 568, or 560, respectively.

This value will always be a multiple of $\pi/2$ radians over the range of $-\pi \leq \phi(c) \leq \pi$. The signal vector is then geometrically rotated by the negative of the coarse phase value that was saved by items 540, 528, 594, 584, 570, or 560, respectively. The scaled and rotated signal components that result are hereafter referred to as the I' and Q' signal vector components. The effect of this vector rotation is to rotate the signal vector such that the rotated signal vector components I' and Q' yield a composite vector with a phase angle in the range of $-\pi/4 \leq \phi_f \leq \pi/4$.

Figure 6A:
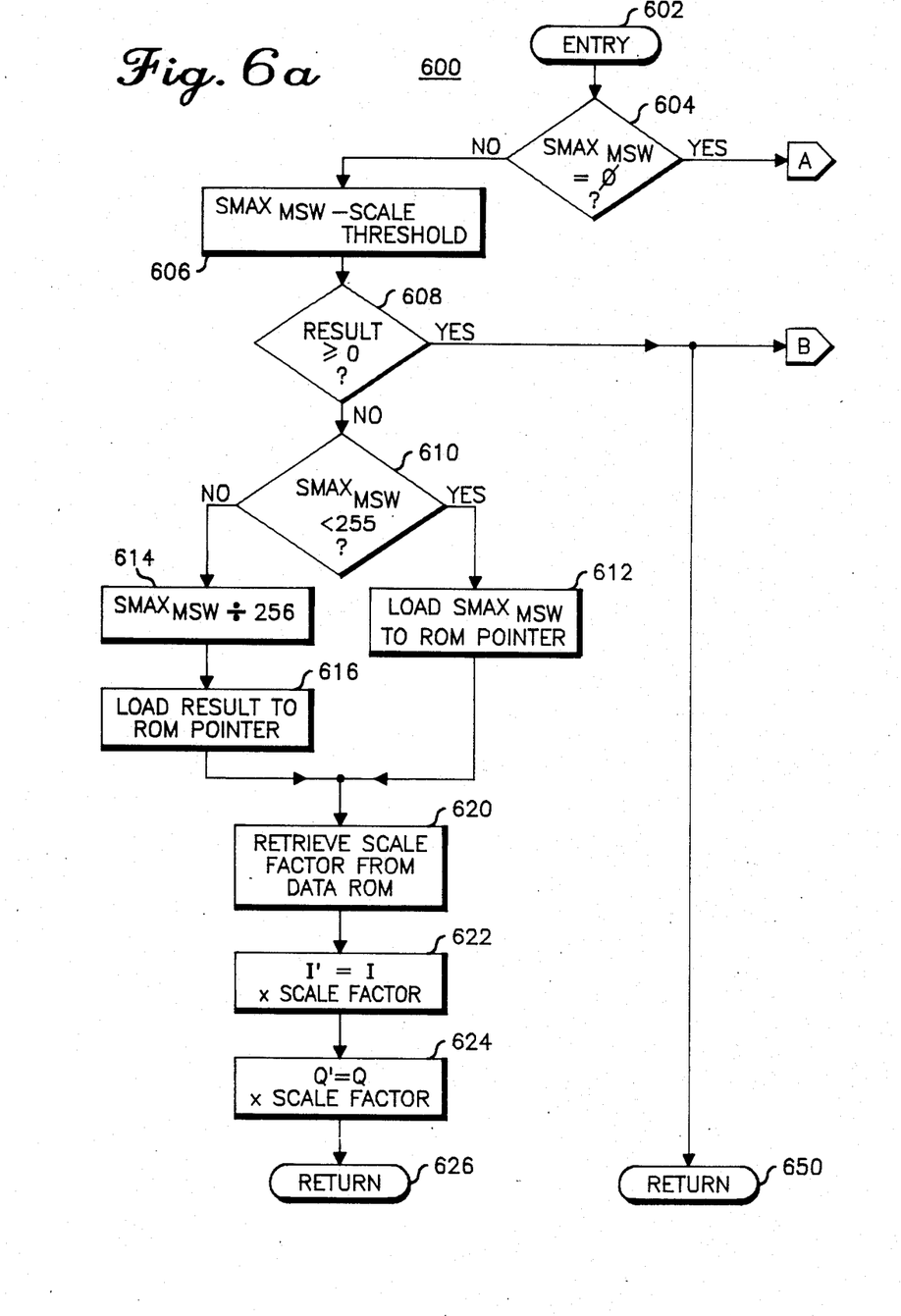
Figure 6B:
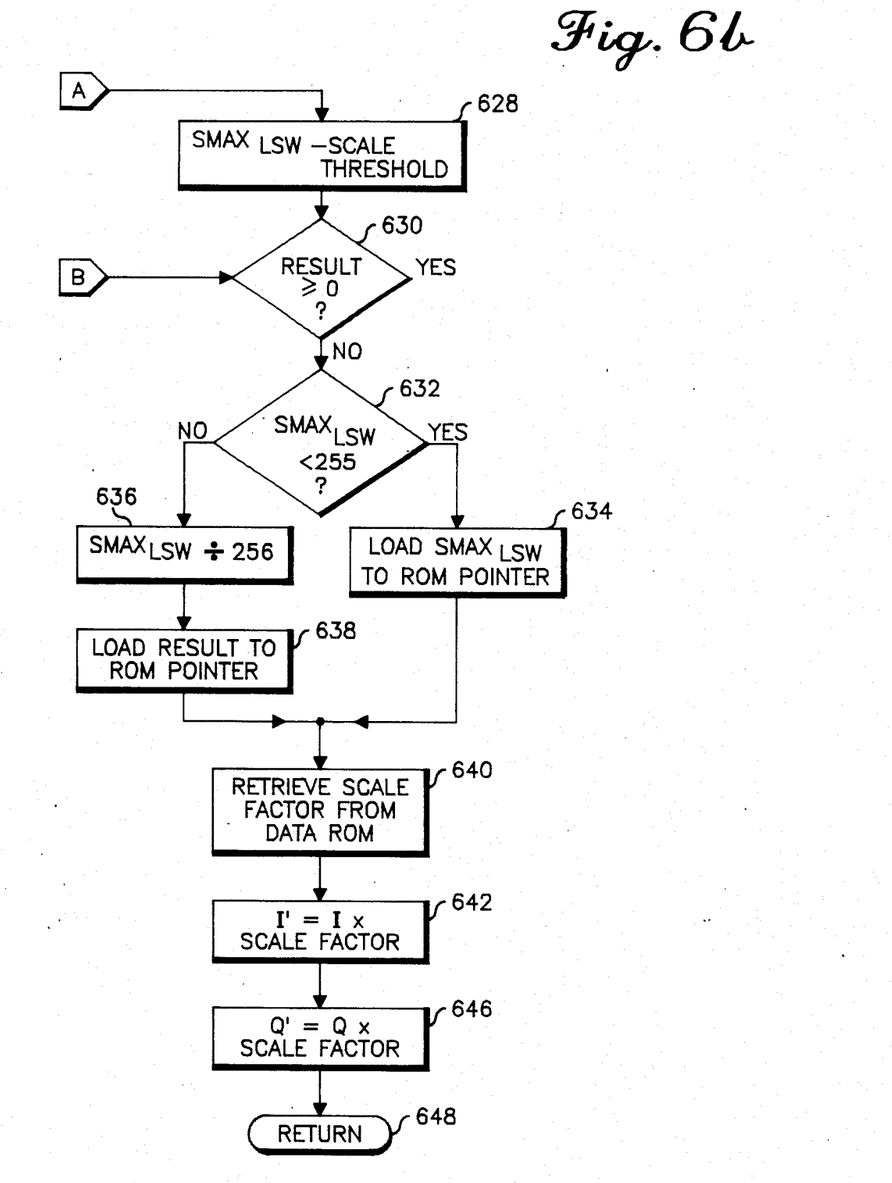

FIGS. 6a and 6b are flow diagrams of the operation of the scale subroutine described in conjunction with FIG. 5a above. The scaling subroutine 600 examines the value of SMAX to determine the correct amount of scaling to be applied to the signal vector components I and Q. The operation of this subroutine is dependent on the resolution or number of bits used to represent the signal vector components. The operation of the scale subroutine will be explained in the context of using 32 bit long words to represent the signal vector components. Upon entry to the scale subroutine at 602, the most significant word MSW of the quantity SMAX is compared to zero by decision 604. If the MSW of SMAX is greater than zero, the least significant word LSW of SMAX will be discarded, and the MSW will be compared to a scaling threshold value by item 606. If the MSW of SMAX is found to equal zero, then the MSW will be discarded, and the LSW will be compared to a scaling threshold value by item 628. The results of the comparisons generated by items 606, and 628, respectively, are tested against zero by decisions 608, and 630, respectively, and if the result is found to be greater than zero, no scaling of the signal vector components is necessary, and the subroutine exits through item 650 to the point where the routine activated subroutine 600. If the retained word (i.e. MSW or LSW) of SMAX is less than the threshold value, the retained word is tested to see if it absolute magnitude is greater than 255 by decisions 610, and 632, respectively. This is equivalent to determining if the upper 8 bits of the retained word of SMAX are greater than or equal to zero. If the result of this test is true (i.e. the MSW or the LSW of SMAX is greater than 255), the retained word is divided by 256 by items 614 or 636 respectively. This has the effect of shifting the upper 8 bits of the retained word of SMAX into the lower 8 bits of this word. If the result of decision 610, or 632 indicates that the retained word is less than 255, then no division is performed. This quantity is now used as an address offset by items 616, 612, 638, or 634 to select values stored in ROM data table, and a scaling factor is retrieved from a ROM by items 620, 640. This factor is adjusted to the correct value necessary to scale the signal vector components, depending on previous decisions 610 or 632. Finally the signal vector components are scaled to the correct region for use by the approximations applied within the demodulator by items 622 and 624 or 642 and 646 and the routine exists back to the calling procedure through items 626 or 648.

Figure 7A:
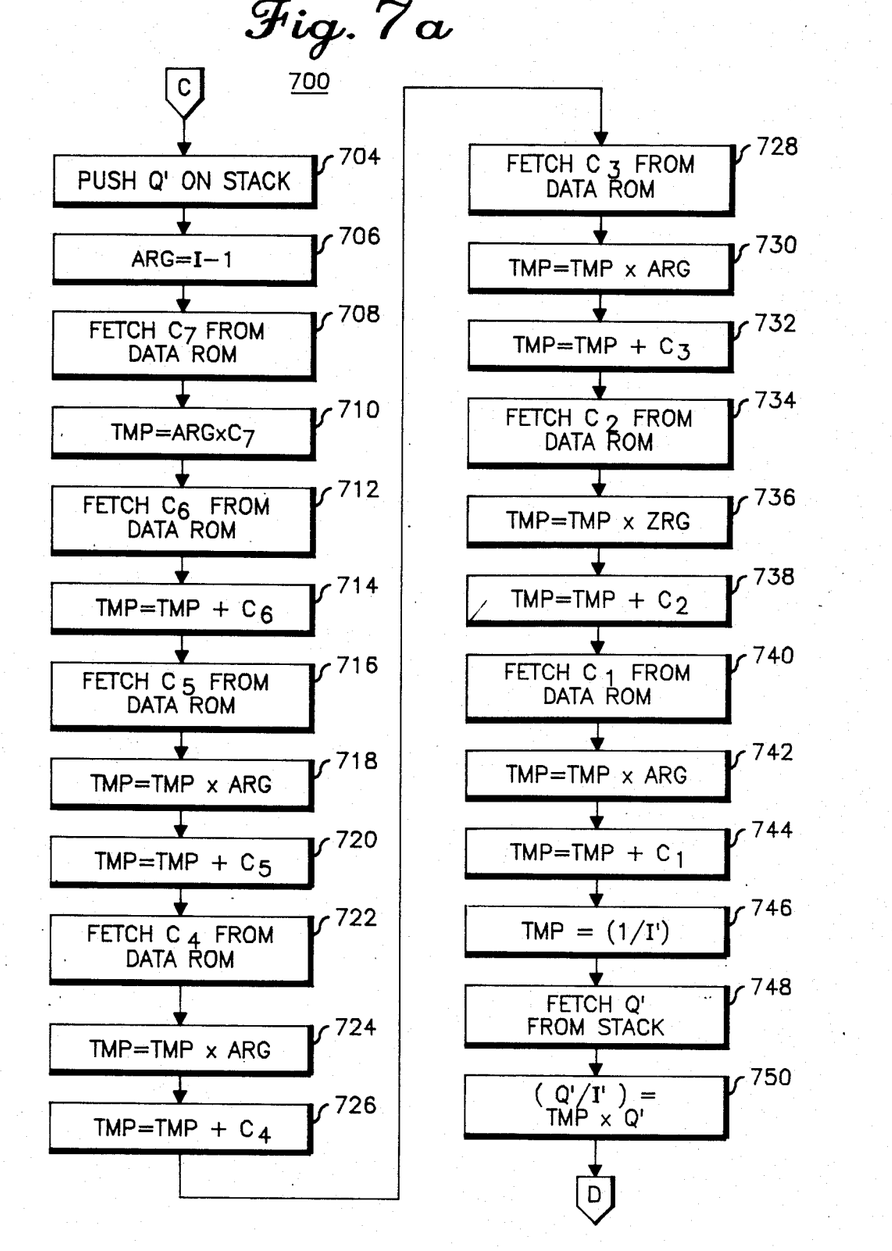
FIGS. 7a through 7c are flow diagrams detailing the operation of the remaining portions of the digital demodulator of the present invention.

Referring now to FIG. 7a, the inverse or reciprocal of the I' vector component is now determined. This processing is accomplished by implementing a 6th order Chebyshev polynominal approximation to the function $f(x) = 1/x$.

The polynomial which approximates this function is:

$$f(x) = (1/x) - \{[[[[[C7(x-1)+C6](x-1)+C5](x-1) + C4](x-1)+C3](x-1)+C2](x-1)+C1\}$$

where,
x = I'
and,
C1 = +1.00000,
C2 = −1.0027,
C3 = +1.00278,
C4 = −0.91392,
C5 = +0.91392,
C6 = −1.62475,
C7 = +1.62475.

Figure 7B:
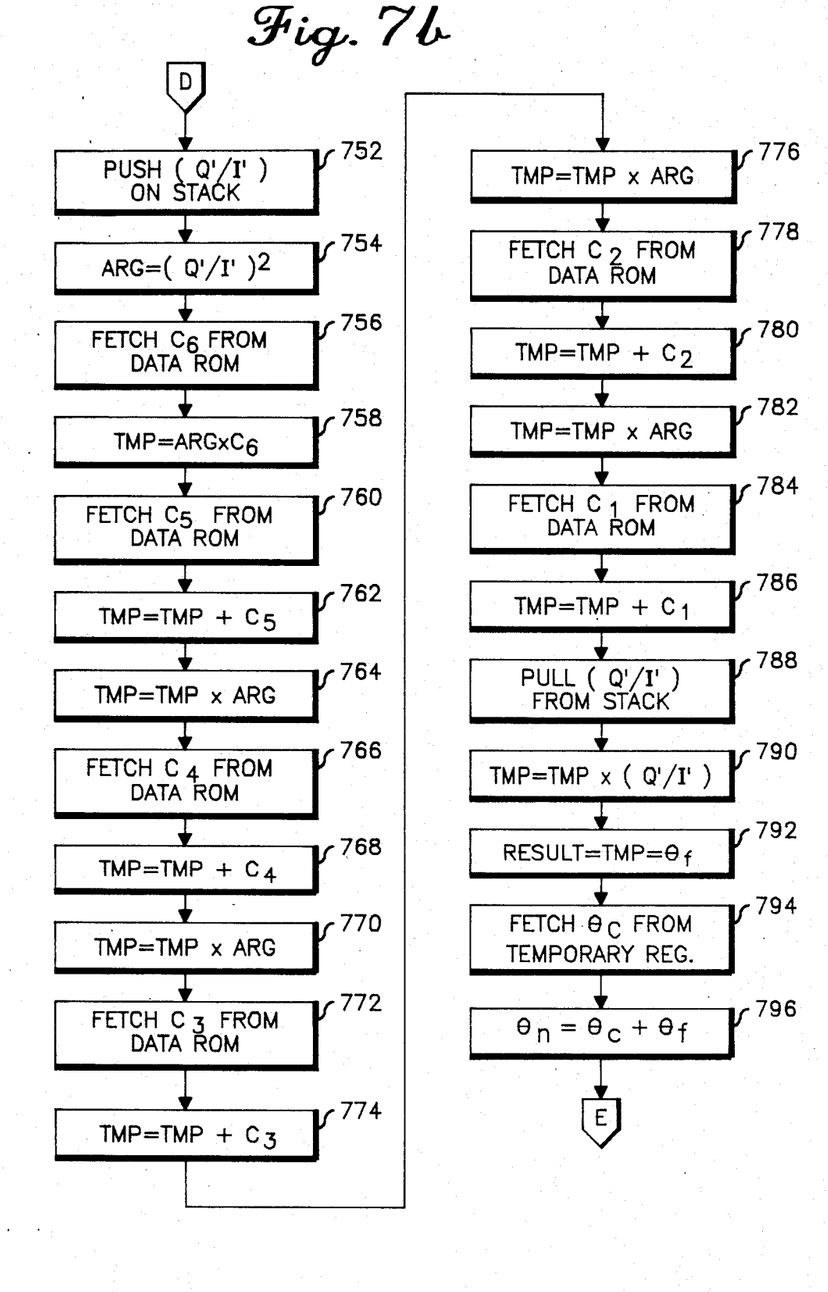

According to the principles of the present invention, the Q' component is pushed on a program stack storage area by item 704 and the quantity (I'−1) is calculated by item 706, hereinafter referred to as the quantity ARG. Coefficient C7 is fetched from data ROM by item 708 and is multiplied with ARG by item 710 forming a quantity TMP. Coefficient C6 is fetched from as data ROM by item 712 and added to TMP by item 714 yielding the new value for TMP. This pattern is successively repeated by items 716 through 744 until the Q' component is then fetched from the program stack storage by item 748 and multiplied with TMP by item 750 yielding an approximation to the quantity $\tan \phi_f = Q'/I'$ The arctangent of the quantity obtained by item 750 is now determined. This processing is performed by implementing a 5th order Chebyshev polynomial approximation to the function:

$$\phi_f = \arctan(x)$$

The polynomial that approximates the function is:

$$\arctan(x) \approx x\{[[[[C6(y)+C5]y+C4]y+C3]y+C2]y+C1\}$$

where,
$x = Q'/I'$
$y = x^2 = (Q'/I')^2$
and,
$C6 = -0.01343$,
$C5 = +0.05737$,
$C4 = -0.12109$,
$C3 = +0.19556$,
$C2 = -0.33301$,
$C1 = +0.99997$.

The quantity $x = (Q'/I')$ is push onto program stack storage by item 752, and the value of the squared quantity $y = x^2$, hereinafter referred to as ARG is calculated by item 754. In a chain like manner, similar to the calcuation of the inverse value described previously, the value of the arctangent of the quantity $(Q'/I')$ is computed by items 756 through 792. The result of this process is a signed value representing the phase angle of the rotated signal vector, or the fine phase angle of the input signal vector sample. The value of the coarse phase of the input signal vector sample is retrieved from a temporary storage location by item 794 and is summed with the result of the arctangent calculation by item 796.

Figure 7C:
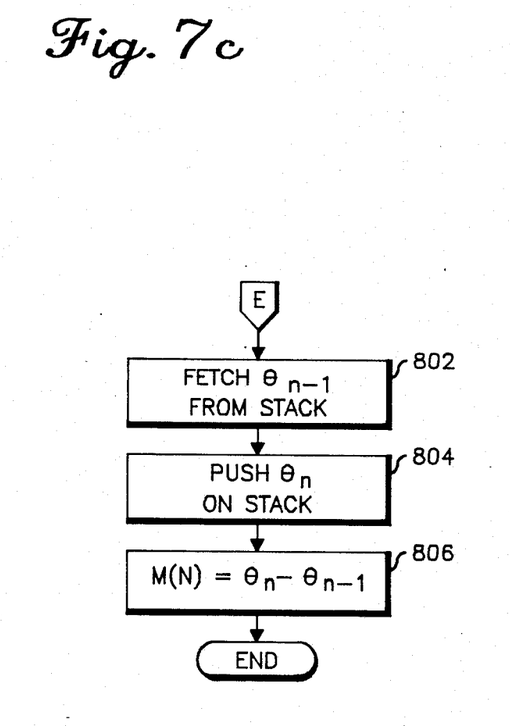

This result represents the phase angle of the input signal vector sample. The phase angle of the previous input signal vector sample, $\phi n-1$, is fetched from a program stack by item 802. The current phase sample is pushed onto a program stack by item 804. Finally, the difference of the previous phase sample and the current phase sample is calculated by item 806 thus yielding an output sample of the demodulated message m(n).

In summary, a digital FM demodulator has been described. According to the principles of the present invention, a digital FM signal is demodulated by processing sampled input vectors of a quadrature FM signal centered near zero frequency. The sampled quadrature input vectors are scaled to lie within a predetermined magnitude range. The scaled vectors are coupled to a phase accumulator which generates a current coarse phase value related to input vectors of the quadrature FM signal. The output of the phase accumulator is also coupled to a vector rotation means which rotates the input vector to a predetermined quadrant to determine a fine phase value based on said rotated input signal vector. The fine and coarse phase values are then summed and output as a composite phase value, and digitally filtered by subtracting the value of the previous composite phase angle sample from the value of the current composite phase angle sample to produce a demodulated message sample. The demodulator of the present invention may also be advantageously employed as a direct phase demodulator, by eliminating the digital differentiation, at steps 802, 804, and 806 respectively. Other uses and modifications of the present invention will be obvious to one of ordinary skill in the art without departing from the spirit and scope of the principles of the present invention.

We claim:

1. A method of digitally demodulating a received angle-modulated signal, said method comprising the steps of:
   (a) inputting digitized quadrature samples of a signal centered approximately at zero frequency, said samples indicating a composite signal vector;
   (b) scaling said samples to a desired magnitude within a predetermined range;
   (c) calculating the nearest octant within which the scaled composite signal vector lies, said nearest octant comprising a coarse phase range value;
   (d) rotationally scaling the scaled composite signal vector to lie within a range between $-\pi/4$ to $+\pi/4$ radians;
   (e) calculating a second value equal to the tangent of the phase of the rotationally scaled signal vector;
   (f) calculating a third value equal to the phase angle of said signal vector by deriving the arctangent of said second value, said third value comprising a fine phase angle value;
   (g) summing the fine phase angle and coarse phase angle values to produce a composite phase angle sample equivalent to the phase angle of the input signal vector;
   (h) filtering said composite of phase angle samples to produce a sequence of demodulated message samples; and
   (i) outputting said demodulated message samples to an output register.

2. A digital demodulator apparatus having improved linearity, said apparatus comprising:
   (a) means for inputting a sampled input vector comprising a quadrature signal centered approximately zero frequency;
   (b) scaler means for quantizing said inputted sampled quadrature signal within a predetermined range;
   (c) phase accumulator means for generating a current coarse phase value related to input vectors of the quadrature signal;
   (d) vector rotation means for rotating said input vector to a quadrant within a range between $-\pi/4$ to $+\pi/4$ radians;
   (e) means for determining a fine phase value based on said rotated input signal vector;
   (f) summing means for summing said fine and coarse phase values and outputting a composite phase value; and
   (g) filtering means for filtering said composite of phase angle samples to produce a sequence of demodulated message samples.

3. A method of digitally demodulating a received frequency modulated signal, said method comprising the steps of:
   (a) inputting digitized quadrature samples of a signal centered approximately at zero frequency, said samples indicating an input signal vector;

(b) scaling said samples to a desired magnitude within a predetermined range;
(c) calculating the nearest octant within which the scaled signal vector lies, said nearest octant comprising a coarse phase value range;
(d) rotationally scaling the scaled signal vector to lie within a range between $-\pi/4$ to $+\pi/4$ radians;
(e) calculating a second value equal to the tangent of the phase of the rotationally scaled signal vector;
(f) calculating a third value equal to the phase angle of said signal vector by deriving the arctangent of said second value, said third value comprising a fine phase angle value;
(g) summing the fine phase angle and coarse phase angle values to produce a composite phase angle sample equivalent to the phase angle of the input signal vector;
(h) subtracting the value of the previous composite phase angle sample from the value of the current composite phase angle sample to produce a demodulated message sample; and
(i) outputting said demodulated message sample to an output register.

4. A digital frequency modulation demodulator apparatus having improved linearity, said apparatus comprising:
(a) means for inputting a sampled input vector comprising a quadrature of frequency modulation digital signal centered approximately zero frequency;
(b) scaler means for quantizing said inputted sampled quadrature signal within a predetermined range;
(c) phase accumulator means for generating a current coarse phase value related to input vectors of the quadrature FM signal;
(d) vector rotation means for rotating said input vector to a quadrant within a range between $-\pi/4$ to $+\pi/4$ radians;
(e) means for determining a fine phase value based on said rotated input signal vector;
(f) summing means for summing said fine and coarse phase values and outputting a composite phase value; and
(g) filtering means for subtracting the value of the previous composite phase angle sample from the value of the current composite phase angle sample to produce a demodulated message sample.

* * * * *

UNITED STATES PATENT AND TRADEMARK OFFICE
CERTIFICATE OF CORRECTION

PATENT NO. : 4,675,882
DATED : June 23, 1987
INVENTOR(S) : Lillie et al.

It is certified that error appears in the above-identified patent and that said Letters Patent is hereby corrected as shown below:

Claim 4, Column 10, line 5, delete the word "of".

Signed and Sealed this

Seventeenth Day of November, 1987

Attest:

DONALD J. QUIGG

Attesting Officer

Commissioner of Patents and Trademarks